United States Patent
Vandenberg et al.

(10) Patent No.: US 6,355,302 B1
(45) Date of Patent: Mar. 12, 2002

(54) CONTINUOUS PROCESS FOR MAKING HIGH PERFORMANCE RETROREFLECTIVE FABRIC

(75) Inventors: John L. Vandenberg, Maplewood; Britton G. Billingsley, St. Paul; Joey L. Reule, Cottage Grove; Frederick J. Fox, Oakdale, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/459,134

(22) Filed: Dec. 10, 1999

(51) Int. Cl.[7] .................................................. B05D 5/06
(52) U.S. Cl. ..................... 427/163.4; 216/7; 156/345
(58) Field of Search .......................... 427/163.4, 165, 427/172, 176; 216/7, 24, 25, 26

(56) References Cited

U.S. PATENT DOCUMENTS

| | | |
|---|---|---|
| 2,326,634 A | 8/1943 | Gebhard et al. |
| 2,354,018 A | 7/1944 | Heltzer et al. |
| 3,172,942 A | 3/1965 | Berg |
| 3,190,178 A | 6/1965 | McKenzie |
| 3,292,029 A | 12/1966 | Palmquist et al. |
| 3,420,597 A | 1/1969 | Nellessen et al. |
| 3,790,431 A | 2/1974 | Tung |
| 3,934,065 A | 1/1976 | Tung |
| 3,989,775 A | 11/1976 | Jack et al. |
| 4,005,538 A | 2/1977 | Tung |
| 4,025,159 A | 5/1977 | McGrath |
| 4,075,049 A | 2/1978 | Wood |
| 4,103,060 A | 7/1978 | Bingham et al. |
| 4,272,564 A | 6/1981 | Grewe et al. |
| RE30,892 E | 3/1982 | Bingham et al. |
| 4,569,857 A * | 2/1986 | Tung et al. ............... 427/163.1 |
| 4,595,627 A | 6/1986 | Steinman |
| 4,618,525 A | 10/1986 | Chamberlain et al. |
| 4,678,695 A | 7/1987 | Tung et al. |
| 5,064,272 A | 11/1991 | Bailey et al. |
| 5,194,113 A | 3/1993 | Lasch et al. |
| 5,344,705 A | 9/1994 | Olsen |
| 5,474,827 A | 12/1995 | Crandall et al. |
| 5,510,178 A | 4/1996 | Olsen et al. |
| 5,738,746 A | 4/1998 | Billingsley et al. |
| 6,159,537 A * | 12/2000 | Crandall ................... 427/163.4 |

FOREIGN PATENT DOCUMENTS

| WO | WO 95/14248 | 5/1995 |
|---|---|---|

OTHER PUBLICATIONS

ASTM E808–94, "Standard Practice for Describing Retroreflection," 1994 No month.

* cited by examiner

*Primary Examiner*—Gregory Mills
*Assistant Examiner*—P. Hassanzadeh
(74) *Attorney, Agent, or Firm*—Stephen C. Jensen

(57) ABSTRACT

Simplified continuous processes are disclosed for converting standard woven or nonwoven fabric into reflectorized fabric in a continuous fashion and in bulk quantities. These processes are easily capable of achieving reflectivities of well over 100 cd/(lux·m$^2$). In the processes, an extended length of fabric is provided such as by unwinding an input roll of fabric to be reflectorized, and the fabric is passed through a station that applies a coating of binder material to the fabric. The fabric then passes through a station where aluminum-coated beads are applied to the coating of binder material. An etching station removes exposed portions of the aluminum coating from the beads after the binder material is allowed to substantially solidify. End-use materials other than fabrics but suitable for enhancing personal conspicuity can be reflectorized in the same way.

20 Claims, 6 Drawing Sheets

CONTINUOUS PROCESS FOR MAKING HIGH PERFORMANCE RETROREFLECTIVE FABRIC

BACKGROUND

The present invention relates generally to continuous methods of making beaded retroreflective products. The invention has particular application to methods of making bulk quantities of retroreflective end-use materials such as fabrics for use or application in shoes, vests, backpacks, handbags, appliques, or similar personal belongings.

The reader is directed to the glossary at the end of the specification for guidance on the meaning of certain terms used herein.

The use of beaded retroreflective fabrics (sometimes referred to in the literature as reflective fabrics) to increase the visibility of pedestrians has long been known. Such fabrics have the property of reflecting incident light, such as light from a vehicle headlamp, back in the general direction from which the light originated, regardless of the angle at which the incident light impinges on the surface of the fabric. Thus, a person wearing such a fabric can be highly visible to drivers of such vehicles at night, depending on (i) the amount of retroreflective fabric used, and (ii) the reflectivity of the particular fabric.

The retroreflectivity is provided by a layer of tiny glass beads or microspheres that cooperate with a reflective agent such as a layer of aluminum. The beads are partially embedded in a binder layer that holds the beads to the fabric, and partially exposed to the atmosphere. Incident light enters the exposed portion of a bead and is focused by the bead onto the reflective agent, which is disposed at the back of the bead embedded in the binder layer, whereupon the light is reflected back through the bead, exiting through the exposed portion in a direction opposite to the incident direction. This type of construction is referred to as an "exposed lens" retroreflector, because it uses microspheres with portions that are exposed to the atmosphere.

There is a wide variety of such beaded retroreflective fabrics available today from a number of manufacturers. However, the methods currently used to make such fabrics on a commercial basis fall into three basic types.

The first type of known process is referred to herein as the "randomized bead" process. In it, a solution that consists of a water-based ink, specially prepared beads, and a coupling agent is applied to the fabric by screen printing, or alternatively by flexographic or continuous roll printing. Each specially prepared bead has been provided with a hemispherical coating of aluminum. When the solution dries, at least some of the beads protrude from the bead bond that secures them to the fabric. No attempt is made to orient each bead so that the uncoated portion is exposed to the air and the aluminum-coated portion is embedded in the bead bond, but in practice enough beads are so oriented (because of their random alignment) so that the treated fabric achieves a reflectivity of up to about 60–70 cd/(lux·m$^2$), and more typically about 25–30 cd/(lux·m$^2$). An advantage of this process is its simplicity, but a major drawback is the relatively low reflectivity achieved.

The second type of process is referred to as the "bead drop" process. In it, a resin that contains tiny flakes of aluminum is roll coated onto the fabric. The coated fabric is then passed through a bead application station, where uncoated glass beads are dropped onto the resin from a bead reservoir above the web. The beads sink partially into the resin. Finally, the web is passed through an oven that cures the resin. Because of the optically inefficient distribution of the aluminum reflector, fabrics prepared using this process achieve reflectivities of only about 30–90 cd/(lux ·m$^2$) at best. Like the randomized bead process, the bead drop process is relatively simple to implement in production, but it also achieves only low reflectivity values.

The third type of known process, referred to as the "release liner" process, is more complex and generally more expensive than the other two, but can produce high performance retroreflective fabrics having reflectivities of 500 cd/(lux·m$^2$) or more. FIGS. 1–3 depict some aspects of a representative process, variations of which can be found in published literature, e.g. U.S. Pat. No. 3,172,942 (Berg), U.S. Pat. No. 5,344,705 (Olsen), U.S. Pat. No. 5,474,827 (Crandall et al.), and U.S. Pat. No. 5,510,178 (Olsen et al.). FIG. 4 depicts a portion of a reflectorized fabric made by such representative process. In FIG. 1, a carrier layer 10 comprising a paper sheet 12 and a heat-softened polymer lining 14 (see detail in FIG. 1a) passes underneath a bead application station 16. Glass microspheres or beads 18 cascade from a reservoir 20 down onto the carrier layer. The beads 18 sink partially into the lining 14, forming a monolayer of beads, portions of which are exposed (see detail in FIG. 1b). After the lining 14 has cooled, the carrier layer 10 with the monolayer of beads 18 is wound up into a roll so that it can be transported to a vacuum chamber 21, shown in FIG. 2. The carrier layer roll is unwound in the vacuum chamber 21 so that, at a metal coating station 22, a specularly reflective metal 24 such as aluminum can be applied to exposed portions of beads 18 and to any exposed portions of lining 14, forming a reflective aluminum film 26 (see detail in FIG. 2a). The carrier layer is wound up, removed from the vacuum chamber, and unwound again for the next operation, shown in FIG. 3. In that figure, a layer of prebinder composition 28 is applied by roll-coating to the aluminum-coated monolayer of beads. This yields a carrier layer web the details of which are substantially as shown in FIG. 3a. The fabric 30 to be reflectorized is then introduced and brought into contact with the prebinder composition 28. In FIG. 3, this is shown by passing the fabric 30 and the carrier layer with its various coatings through a nip formed between rollers 32. FIG. 3b shows the details of the resulting web. The web so constructed then passes through an oven 31, where prebinder composition 28 solidifies. In a final step (not shown), the carrier layer 10 is stripped away and discarded to make fabric 30 retroreflective as shown in FIG. 4, by virtue of the partially exposed monolayer of beads 18 cooperating with the underlying reflective film 26, both held to the fabric by binder layer 28. Such a fabric can achieve reflectivities of 500 cd/(lux·m$^2$) or more because of the consistent placement of the reflective aluminum film on the embedded portion of each bead.

Each of the three above-described processes has been used commercially since at least about the mid-1970s. However, until now there has been no continuous process that is both: (i) considerably simpler than the release liner method, and (ii) capable of producing highly retroreflective fabrics. This is so despite a general awareness of other methods of making certain exposed lens retroreflective articles, including the method of U.S. Pat. No. 3,790,431 (Tung), where a binder material is coated on an open web type fabric, microspheres completely covered with a reflective material are applied to the coated fabric, the binder material is dried or cured, and reflective material covering exposed surfaces of the microspheres is removed, as by etching. See also U.S. Pat. No. 3,934,065 (Tung); U.S. Pat. No. 3,989,775 (Jack et al.); U.S. Pat. No. 4,005,538 (Tung);

and 4,678,695 (Tung et al.). Thus, there has been a long-felt need for a relatively simple continuous process capable of making large quantities of high performance reflectorized fabric.

BRIEF SUMMARY

Disclosed herein are continuous processes capable of manufacturing commercial quantities of high performance reflective fabric, i.e., fabric having a reflectivity of at least about 100 cd/(lux ·m$^2$), but which are greatly simplified compared to the release liner method because they do not require the use of any release liner.

Instead, in the disclosed processes, an extended length of fabric is provided such as by unwinding an input roll of the fabric to be reflectorized, and the fabric is then passed through a coating station that applies a coating of binder material to the fabric. The fabric then passes through a bead application station, where aluminum-coated beads are applied to the coating of binder material. An etching station receives the fabric and removes exposed portions of the aluminum coating from the beads. The disclosed processes thus convert standard fabric to reflectorized fabric in a continuous fashion suitable for handling bulk quantities, and are easily capable of achieving reflectivities of well over 100 cd/(lux·m$^2$).

In some disclosed processes, beads are distributed over substantially the entire front surface of the fabric, while in others the beads are provided on only parts of the front surface, such as in the form of indicia. Techniques are disclosed for achieving a high packing density of beads, which has been found elusive for fully aluminum-coated microspheres. The various steps of the process can be carried out in an uninterrupted sequence, or if desired the fabric can be wound up, stored or transported, and unwound between some of the steps. Advantageously, process steps carried out in a vacuum chamber and the associated expense and added difficulty can be avoided since a reflective vapor coat need not be applied to the web itself.

Figure 1:
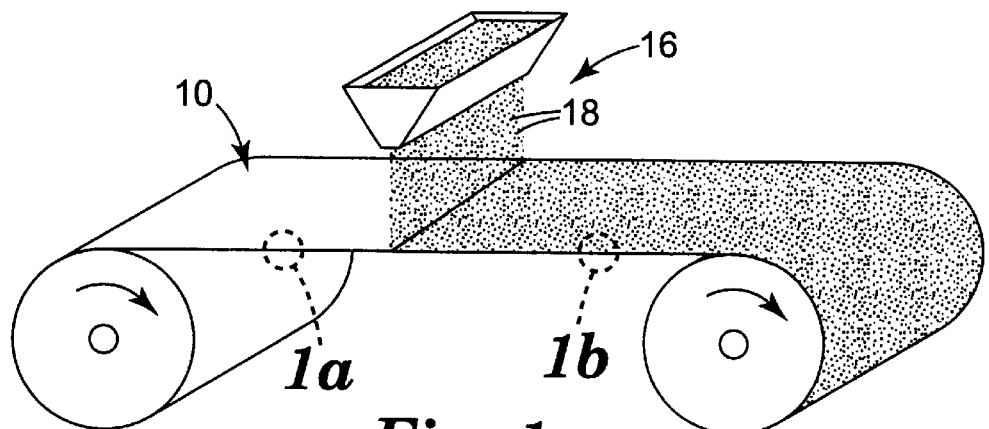
FIGS. 1, 2, and 3 are perspective views of a representative PRIOR ART release liner process already described.
Figure 1A:
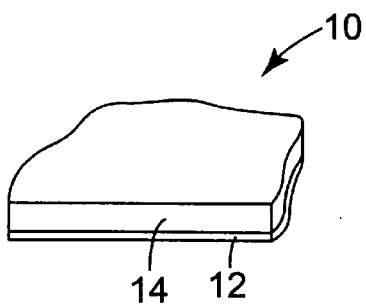
FIGS. 1*a*, 1*b*, 2*a*, 3*a*, 3*b* are magnified perspective views in partial section of the webs as indicated in FIGS. 1–3.
Figure 1B:
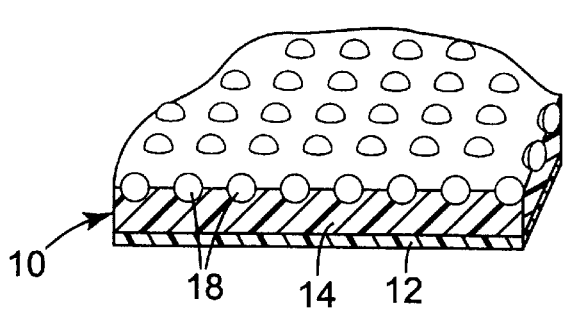

In the drawings, the same reference symbol is used for convenience to indicate elements that are the same or that perform the same or a similar function. The drawings are not intended to be to scale or otherwise dimensionally accurate unless otherwise noted. In particular, the thickness of the aluminum film in FIGS. 2*a*, 3*a*, 3*b*, 4, 5*c* and 5*d* is greatly exaggerated for ease of description.

DETAILED DESCRIPTION OF THE ILLUSTRATIVE EMBODIMENTS

Figure 2:
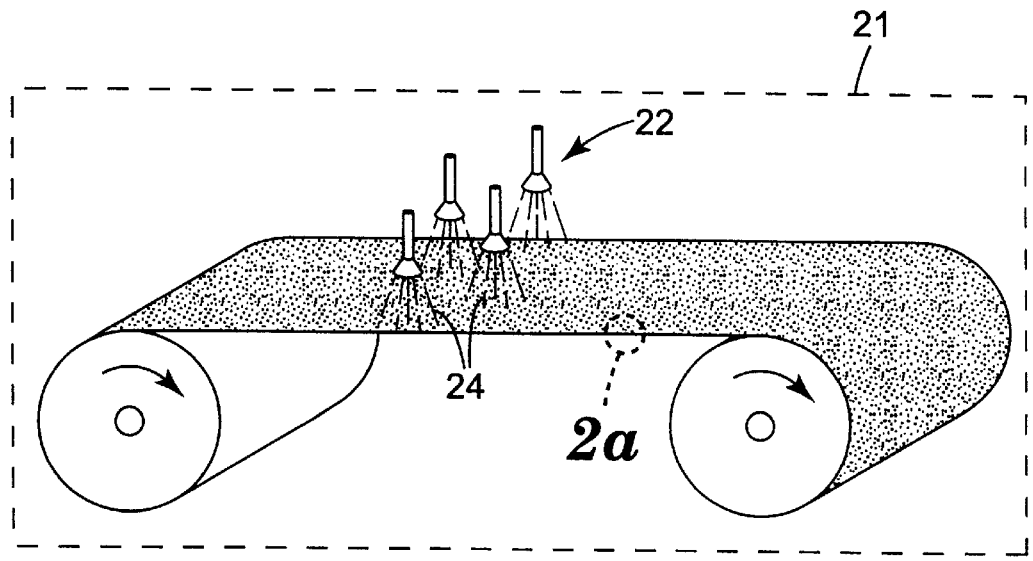
Figure 2A:
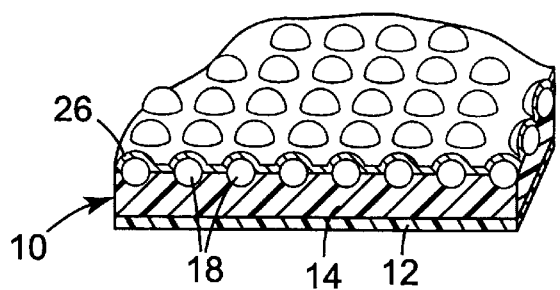
Figure 3A:
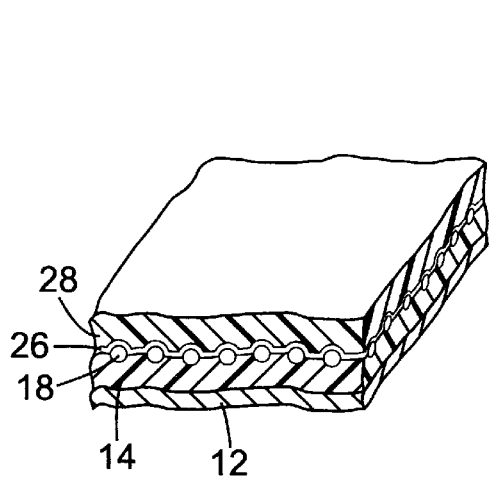
Figure 3B:
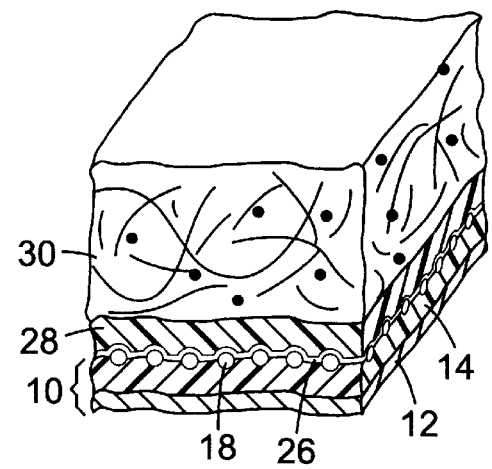
Figure 3:
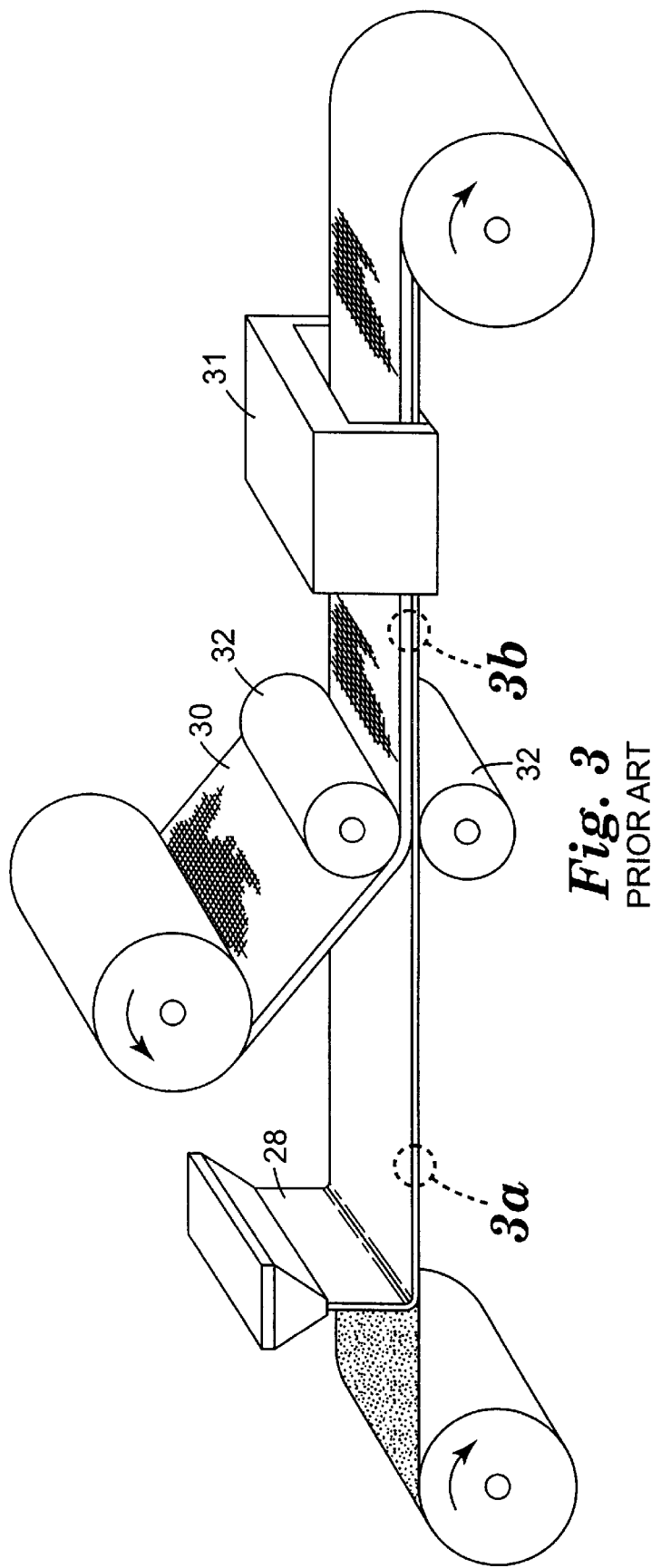
Figure 5:
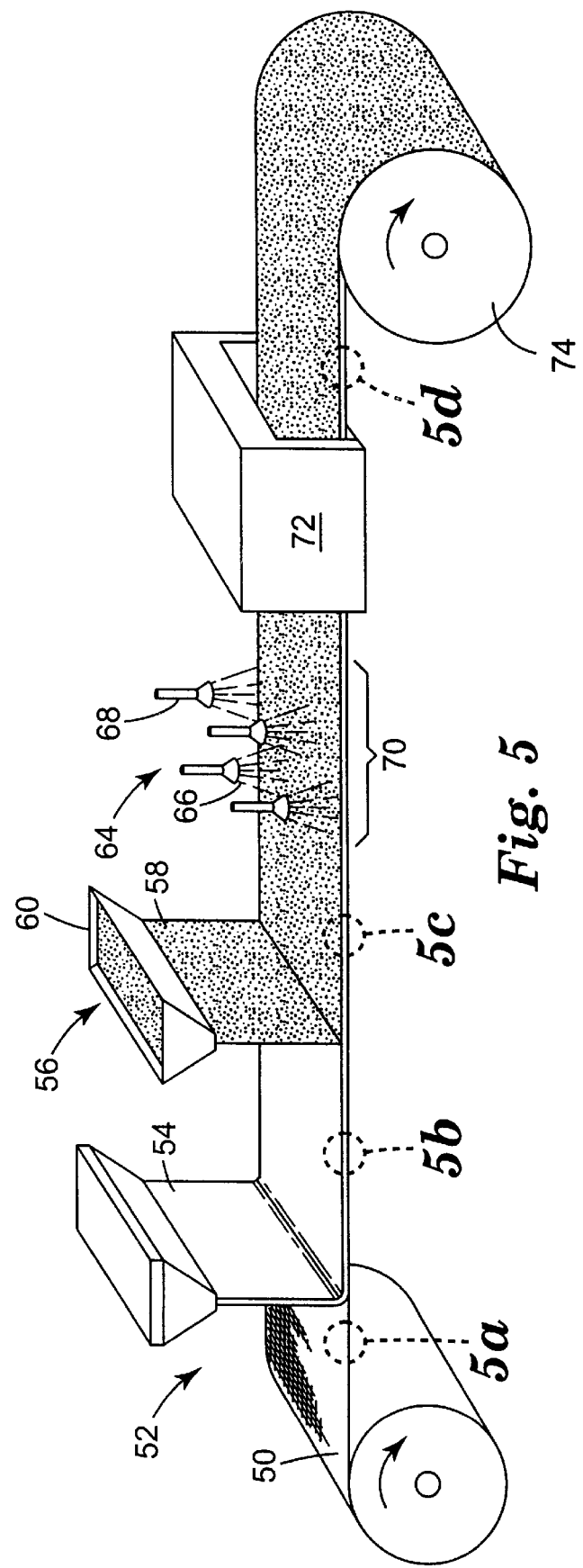
FIG. 5 is an idealized perspective view of a simplified continuous process for making high performance retroreflective fabrics.
Figure 5A:
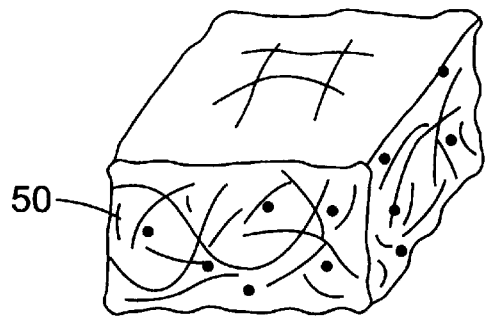
FIGS. 5*a–d* are magnified perspective views in partial section of the web at various stages in the process of FIG. 5.

FIG. 5 shows a view of a process capable of making high performance retroreflective fabrics, but which is greatly simplified over the release liner process of FIGS. 1–3. Unlike the release liner process, the process of FIG. 5 begins with providing the fabric 50 to be reflectorized. FIG. 5*a* depicts the fabric in a magnified view to reveal the constituent fibers making up the fabric. As shown in FIG. 5, the fabric is unwound at a constant rate from an input roll, and typically has a width of about 12 to 60 inches (~0.3 to 1.5 meters) and a length of at least about 10 meters, and more often about 3000 meters or more. Unwinding the fabric from a roll presupposes that the fabric was previously manufactured in one facility, and shipped to a different facility for reflectorization. In an alternate approach, the reflectorization process of FIG. 5 can be carried out at the end of the manufacturing line for the fabric, in which case the input roll would be eliminated.

Figure 5B:
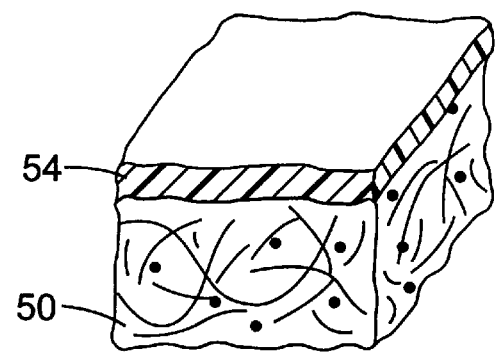

For ease of description, the term "web" is used herein to refer to the fabric together with any other layers or components applied thereto during the manufacturing process. The web passes through a coating station 52, where a binder material 54 is applied to a surface (designated the "front" surface) of the fabric 50. The binder material can be any composition that has good adherence to the fabric and to the coated beads, described below. Preferred binder materials include acrylics, urethanes, epoxies, rubber, and olefins. Ordinarily the binder material will not unduly stiffen the construction, but rather will substantially maintain the suppleness and flexibility of the fabric. In keeping with this, as shown in FIG. 5*b*, the binder material can be applied in a layer that is thin compared to the fabric thickness. Although some of the binder material flows down between the fibers of the fabric, preferably the binder material is not allowed to fully and uniformly penetrate the fabric thickness. Rather, the binder material remains concentrated near the front surface of the fabric. This can be accomplished by minimizing the time during which the binder material is in a liquid state. For example, if the binder material is a thermoplastic that is extruded or hot can coated in a thin layer onto the fabric, the movement of the web away from coating station 52 to a lower temperature zone, optionally coupled with active cooling of the web with fans, chilled rollers, or the like, can suffice to quickly solidify the binder material, halting its migration into the fabric.

Figure 5C:
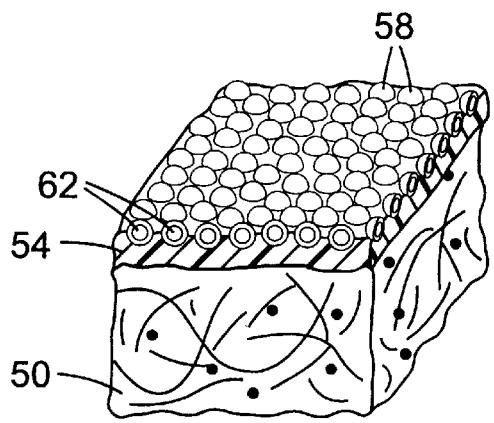

Following coating station 52, the web passes through a bead application station 56. There, aluminum-coated beads 58 are applied to the coating of binder material 54 so as to form a monolayer of such beads (FIG. 5*c*). Each of the beads is partially embedded in the binder material and partially exposed at the front of the web. Depending upon the orientation of the web during bead application, the beads are drawn into the binder material 54 by their own weight or force of impact, by surface tension, by an externally applied force, or the like. In FIG. 5, the beads are shown falling in a curtain from a reservoir 60 disposed above the web. Prior to being deposited in reservoir 60, each bead was treated so as to have a thin coating 62 of aluminum substantially around its entire outer surface. This can be accomplished, for example, by sputter- or vapor-coating aluminum onto a quantity of beads while the beads are being randomly reoriented by stirring or agitation. However, the particular bead coating procedure used is of no significance to the present invention, so long as the aluminum film is highly reflective and is in contact with substantially the entire outer surface of the bead. Aluminum is preferred among other possible metals in this application because it can easily be made highly reflective, it can readily be etched away with simple chemistries that are not environmentally toxic, and it is relatively inexpensive. As shown in FIG. 5c, the aluminum coating 62 is of substantially uniform thickness on the bead. A thickness of about 20 to 200 nanometers (nm) is considered adequate for this coating 62. Typically, the bead is made of a glass composition and has a diameter of about 20 to 200 $\mu$m, and more desirably about 40 to 120 $\mu$m. The refractive index of the bead is selected so that light entering one side (designated the "front") of the bead is focused at or near the opposed back side of the bead. A refractive index of about 1.9 for visible light is typical when the front of the bead will be exposed to air. Beads made by Minnesota Mining and Manufacturing Co., having a refractive index of about 1.92, an average diameter of about 65 $\mu$m, and a barium titanate glass composition of nominally 43.5% $TiO_2$, 29.3% $BaO$, 14.3% $SiO_2$, 8.38% $NaO_2$, 3.06% $B_2O_3$, and 1.44% $K_2O$, and having a softening temperature of about 610° C., are among the many types of beads that can be used. Suitable glass beads or microspheres having other formulations are also commonly available on the open market. At station 56, the binder material 54 is tacky so that beads 58 can stick thereto or become embedded therein. In one embodiment, bead application station 56 is physically proximate to or substantially coincident with coating station 52. In such case the beads 58 are applied to the web while binder material 54 is still in a liquid state or is at least tacky. In another embodiment the binder material solidifies in a zone between stations 52 and 56 and is made to be liquid or tacky at the application station 56, such as by applying heat if the binder material is a thermoplastic. In both embodiments the beads may be only slightly adhered to or embedded in the binder material when they first contact the binder material, and further liquification of the binder material (e.g. by application of heat) may be necessary downweb to cause the beads to sink into the binder material to approximately half their diameters. In another approach, preheated beads can be applied to the web to locally heat the binder material. Such preheated beads can be used with or without additional heating of the web. The bead temperature can be sufficient to tackify or even liquify the binder material locally so that a substantial portion of the bead becomes embedded in the binder material.

As the web advances beyond station 56, the binder material 54 is preferably solidified in preparation for the etching step which follows at an etching station 64. At station 64, the portion of aluminum coating 62 that is exposed to the atmosphere is removed using an etching agent that does not attack the underlying glass bead or substantially damage the surface of the glass bead. The etching agent is preferably an alkali solution 66 such as potassium hydroxide or more preferably sodium hydroxide that is simply sprayed onto the front surface of the web with nozzles 68 as shown, and collected in a trough 70 for recycling or reuse. The residence time of the alkali solution on the web is sufficient to remove the aluminum and expose the approximately hemispherical surface of the beads 58 not embedded in binder material 54. The remainder of the aluminum layer is effectively protected from the etching solution by the binder material. The etching agent can alternatively comprise radiation or particles that remove the exposed aluminum coating 62 by ablation. Still another etching agent can comprise water or steam, that removes exposed portions of the aluminum coating from the beads by converting the aluminum coating into a substantially transparent coating on the beads, the transparent coating being composed not of metallic aluminum but rather of aluminum hydroxioxide, also known as boehmite.

Figure 5D:
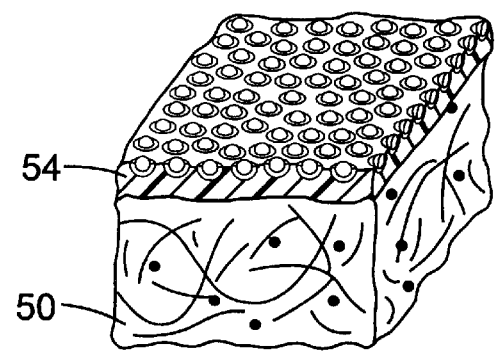

The unetched portion of the aluminum layer forms a substantially continuous hemispherical high quality reflector on the back of each bead, as shown in FIG. 5d. It is this high quality reflector, provided on substantially every bead, that enables the process to achieve reflectivity values well above 100 cd/(lux·m$^2$) if the packing density of the beads on the surface is sufficiently high. FIG. 5d also depicts the web as it appears after the additional steps of rinsing with water and drying with heat and/or forced air. Another such step is "souring" the web, preferably carried out before but alternatively after rinsing with water, which neutralizes any residual base solution on the fabric by spraying the web or otherwise exposing it to a mild acid bath. These additional steps are performed at stations generically labeled as 72. The finished, reflectorized fabric is collected in an output roll 74. The output roll can be what is referred to in the art as a jumbo roll, which has substantially the same web width as the input roll that feeds fabric into coating station 52. Alternatively, slitters can be used as is known in the art to divide the web along its width into a plurality of narrower output rolls.

As described, the process of FIG. 5 is capable of producing on a continuous basis large quantities of high performance retroreflective fabric while avoiding the need for any release liner or any process step requiring the web to be placed in a high vacuum environment. It is possible for all process steps to be performed simultaneously on a single extended length of fabric as the fabric advances from the starting material input roll to the finished output roll. Such a comprehensive uninterrupted process minimizes disruptive windup and unwind web handling procedures. Alternatively, the extended length fabric can be wound up on intermediate rolls and then unwound between one or more process steps. One benefit of the latter "intermediate roll" approach is flexibility in the manufacturing chain, in which one manufacturer can perform some of the process steps and ship an intermediate roll of the unfinished fabric to another manufacturer for further processing. Another benefit of the intermediate roll approach is flexibility in tailoring the processing speed of each processing step for maximum throughput and/or optimum performance, so that the slowest process step does not dictate the web speed for all of the other process steps. Rather, the steps can be performed at different web speeds that are optimal for each step or for a group of steps.

Figure 4:
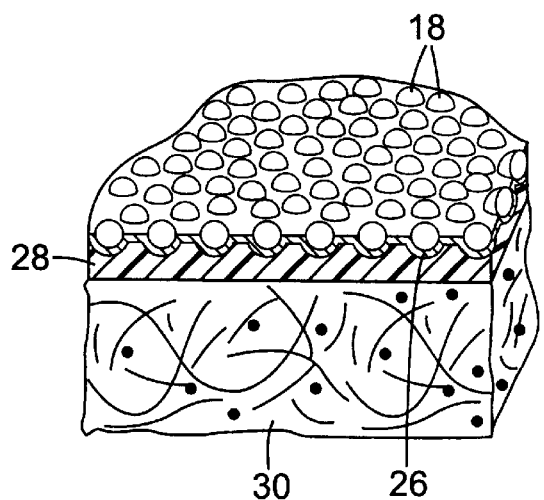
FIG. 4 is a magnified perspective view in partial section of reflectorized fabric made by the PRIOR ART process of FIGS. 1–3.

A comparison of the reflectorized fabric of FIG. 4, made using the prior art process, with the fabric of FIG. 5d, made using the improved simplified process, is instructive. In the fabric of FIG. 5d, the binder material is exposed on the front surface in the spaces between beads, whereas the spaces between beads in FIG. 4 are all covered with aluminum film 26. The exposed aluminum between beads in the prior art article is aesthetically detrimental in that it increases the gray-cast appearance of the bead-coated area, and it is subject to corrosion when contacted by sweat or other fluids. A known variation of the prior art release liner process is selection of materials such that the portions of the aluminum film exposed between beads adheres more strongly to lining 14 than to binder layer 28, so that such aluminum film portions are removed when the carrier layer is stripped away. In practice however it is difficult to adjust the prior art process to produce a clean separation of the aluminum film portions. Even if a clean separation is achieved, the number of possible binder layer compositions useable with the process is severely limited and the adherence of the aluminum layer underneath each bead to the binder layer is compromised. In contrast, a wider variety of binder materials can be used in the simplified process described herein, with possible selection criteria being maximum bonding strength to the fabric and aluminum-coated beads, color, transparency, flexibility, or other desired properties.

Figure 6:
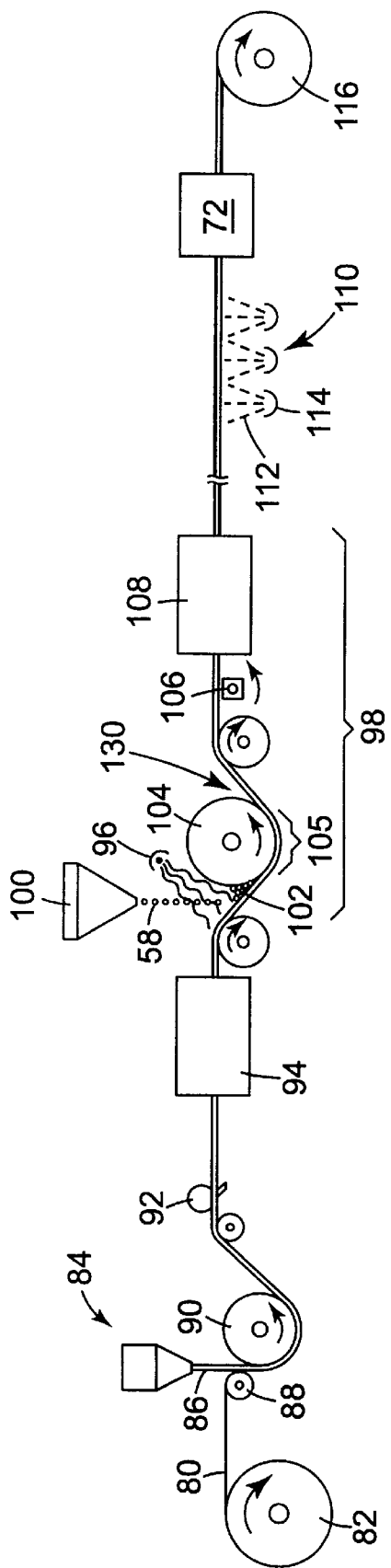
FIG. 6 is another simplified continuous process for making high performance retroreflective fabrics, shown with more processing details than FIG. 5.

In FIG. 6, a fabric 80 similar to fabric 50 is unwound from an input roll 82 and continually fed into a coating station 84. At the coating station, a binder material 86, in this embodiment a hot melt adhesive, is extruded at an elevated temperature and dropped in a liquid state onto a front surface of the web at a nip formed between an unheated rubber roller 88 and a larger unheated steel roller 90. Binder layer compositions disclosed in U.S. Pat. No. 5,738,746 ("Clothing Bearing Retroreflective Appliques" by Billingsley et al.) are well suited for use as the hot melt adhesive. The nip gap is selected to be somewhat greater than the thickness of the web so that the liquid binder material is not forced too deeply into the fabric. The extrusion rate and web speeds are selected so that binder material 86 is applied in a thickness less than the thickness of the fabric. Although rollers 88,90 are not actively heated, the presence of the hot binder material 86 raises their surface temperature somewhat above ambient room temperature. The coated front surface of the web remains in contact with the outer surface of roller 90 for part of the rotation cycle of the roller, and then separates from it. To promote a clean separation, the outer surface of roller 90 has a matte finish. At the point where the web separates from roller 90, binder material 86 can still be liquid but preferably has substantially solidified. A diskshaped slitter 92 is provided on both sides of the web to trim the edges of the web. Where the binder material has been substantially solidified, the web can then be preheated by an oven 94 to a temperature close to but slightly under the softening point of binder material 86. Additional heat can be provided by infrared lamps 96 directed at the front surface of the web, serving to soften the binder material (a thermoplastic) to a state that is tacky but not liquid at bead application station 98. If the heat output of lamps 96 is great enough, preheating oven 94 can be eliminated. Lamps 96 can also be directed as shown toward the beads 58 for heating the beads, and can also be directed toward the roller 104, to promote bead adhesion to the binder material. As mentioned above, it is desirable to keep the time during which the binder material is liquid to a minimum in order to prevent loss of the binder material by migration into the fabric, where the fabric is a cloth or other material having a substantial amount of interstitial space or voids.

Fully aluminum-coated beads 58 have been found to exhibit an unexpected mutually repelling property that establishes an upper limit to the packing density achievable when using simple bead dropping techniques such as depicted at bead application station 56 in FIG. 5. What is observed is that regardless of how fast the beads are introduced, the beads situate themselves in an isolated fashion individually or in strings of beads on the tackified surface of the binder material, achieving an average of only about 50% packing density over the front surface of the web. A satisfactory explanation for this behavior has not been found, but it may relate to electrostatics and the capacitor-like construction of the fully metal-coated beads.

Regardless of the explanation, one practical solution to the problem is shown in the configuration of bead application station 98. There, beads 58 are cascaded from a reservoir 100 in a curtain so that they collect in a churning bank 102 of beads at a point where the web comes into contact with a roller 104. The web is held in tension against the roller in an extended region identified in the figure as 105. The pressure between the web and the surface of roller 104 in region 105 combined with the adjacent bank of beads immediately upweb of region 105 is sufficient to achieve average packing densities well above 50% and approaching the theoretical limit for equal diameter spheres of about 90%.

Excess beads are removed from the web using a rotating beater bar 106. The web then passes through an oven 108 maintained at a temperature that liquifies the thermoplastic binder material 86 so that the closely-packed beads can sink into the binder material to about half their diameters. Upon exiting the oven 108 at the final stage of bead application station 98, and cooling, the beads are firmly adhered to the fabric. The web is then inverted for processing at the etching station 110. The web inversion can be accomplished by two 90 degree bends in the web path, by a windup and unwind operation, or any other conventional means. An etching solution 112 is sprayed upward by nozzles 114 onto the front surface of the web. Souring, rinsing, and drying occurs at block 72 as described in connection with FIG. 5, and the finished fabric is wound up on output roll 116.

Figure 7:
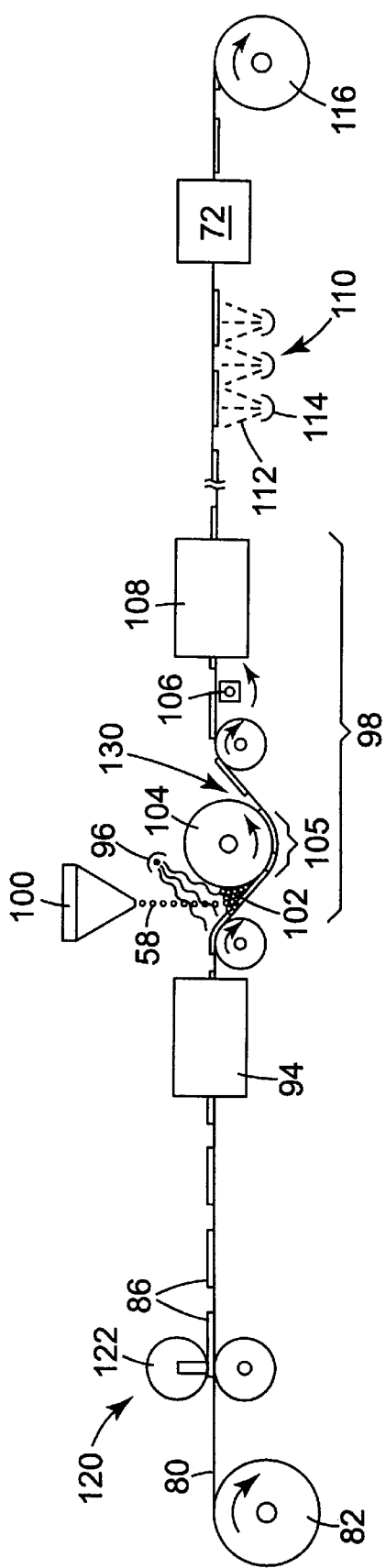
FIG. 7 is another simplified continuous process for making high performance retroreflective fabrics, wherein the fabric is reflectorized on only portions thereof.

FIG. 7 shows an embodiment similar to FIG. 6 except coating station 84 is replaced with a coating station 120 that applies the binder material 86 in a discontinuous layer rather than in a continuous layer over the entire front surface of the fabric as in FIGS. 6 and 5. The binder material is fed axially into a rotary screen printing drum 122, whose periphery is provided with a pattern of blocked and open holes that define a pattern. The pattern may be such as to form indicia easily visible to an ordinary observer such as a graphic symbol, a decorative pattern, words, stripes, or the like. Alternatively, the pattern may define an array of tiny dots that are not discernable by an ordinary observer, the array of dots extending over the entire front surface of the fabric or arranged into macroscopic indicia. Beads that are applied to the web at the bead application station will of course only adhere to the fabric where the discontinuous layer of binder material is present. The bead packing density in such a construction is high in the areas covered by binder material, substantially zero in the areas not covered by binder material, and an intermediate value when averaging over the entire front surface of the fabric.

EXAMPLE 1

A woven polyester fabric having a nominal width of approximately 13 inches (~0.3 meters) and length of approximately 400 yards (~365 meters) was provided on an input roll. The fabric thickness was about 7 mils (~180 $\mu$m). The fabric was unwound from the roll and passed through a coating station at a constant web speed of about 15 ft/min (~7.6 cm/sec) where a 3 mil (~75 $\mu$m) thick continuous layer of an acrylic terpolymer (Escore brand, type AT325) binder material was extruded from an extrusion die at a temperature of about 375° F. (~190° C.) onto the entire front surface of the fabric. As the web exited the coating station it was immediately allowed to cool and rolled up onto an intermediate roll.

The intermediate roll was then moved to another location and unwound at a constant web speed of about 35 ft/min (~18 cm/sec). Initially, the web was passed along a hot can (heated roller), heating the web to about 160° F. (~70° C.) to tackify the binder material. The heated web was then passed through a bead application station similar to station 98 shown in FIG. 6 except that the bead reservoir 100 was positioned immediately downweb of roller 104, rather than immediately upweb of it as shown in the figure. The flow rate of the uniform curtain of beads was adjusted to form a rolling bank of beads similar to bank 102 but formed along the exit nip (labeled 130 in FIG. 6) where the inclined web leaves contact with roller 104. The bank of beads approximated a circular cylinder having a diameter of about ½ inch (~10 mm) and extending along the entire width of the web. If desired, baffles can be installed at the sides of the web to maintain uniformity of the bead bank, but such baffles were not needed for this example. The beads used were the barium titanate beads described above, having a refractive index of about 1.9, diameters ranging between about 30 to 120 μm and averaging about 60 μm, and having a sputter-coated aluminum layer about 30 to 40 nm thick on the entire outer surfaces thereof. The coated beads stuck to the tackified front surface of the web with an average packing density of about 50%, despite the dense population of beads in the rolling bead bank. The web, with coated beads stuck to the binder material but not substantially embedded therein, was then passed through an oven and heated to about 350° F. (~175° C.) to liquify the binder material so that the beads sank about half way into the binder material. Passing beyond the oven, the web cooled to solidify the binder material and was wound onto a second intermediate roll.

The second intermediate roll was then ready for unwinding at an etching station followed by a rinsing and drying procedure, and windup into a finished output roll. In lieu of such a continuous process, a portion of the web was cut from the second intermediate roll and sprayed with an aqueous solution of 0.5 molar (2%) sodium hydroxide at ambient room temperature to dissolve the exposed aluminum coating from the beads. After about 1 minute, the web portion was sprayed with deionized water to remove all traces of sodium hydroxide and dissolved aluminum, and air dried. The web portion had a packing density of beads, measured at two to three representative locations, between about 40 to 55% as determined by visual inspection through a microscope on areas about 1 mm² in area, and exhibited a reflectivity of about 230–300 cd/(lux·m²).

EXAMPLE 2

A fabric was unwound and coated with binder material, wound into an intermediate roll, and unwound and passed along a hot can, all as described above in Example 1. The heated, tackified web was then passed through a bead application station substantially as shown and described in connection with bead application station 98 of FIG. 6. The beads were dropped in a uniform curtain as shown with a flow rate that formed a bank of beads 102 as shown in FIG. 6, the bank approximating a circular cylinder having a diameter of about ½ inch (~10 mm) and extending along the entire width of the web. The roller 104 was made of steel and had a polished surface finish. The extended region 105 (see FIG. 6) was about 10 inches (~¼m) long, and roller 104 had a diameter of 1 foot (~0.3 m). The beads used were the same as those of Example 1. The coated beads stuck to the tackified front surface of the web with a typical packing density of up to about 85%. The web, with coated beads stuck to the binder material but not substantially embedded therein, was then passed through an oven and heated to about 350° F. (~175° C.) to liquify the binder material so that the beads sank about half way into the binder material. Passing beyond the oven, the web cooled to solidify the binder material and was wound onto a second intermediate roll.

In lieu of a continuous etching, rinsing, and drying procedure, a portion of the web was treated in the same manner as described above in Example 1. The web portion of this Example 2 had a packing density of beads between about 70–85% as determined by visual inspection as described in Example 1, and exhibited a reflectivity of about 300–330 cd/(lux·m²).

GLOSSARY OF SELECTED TERMS

"Aluminum" when used in connection with a layer, coating, or film refers to metallic aluminum and alloys thereof capable of forming a reflector.

"Average packing density". The average of at least 10 individual packing density measurements made at different locations on the fabric that are substantially representative of the fabric (or a portion thereof) under test.

"Continuous process" means a process in which substantially all of the individual steps that make up the process are carried out on a web or substrate that is in substantially constant motion relative to the equipment or other agent responsible for carrying out such individual process steps.

"Fabric" means a woven or nonwoven cloth or other end-use material suitable for use in shoes, vests, backpacks, handbags, appliques, or like personal belongings.

"Liquid" or "liquify", when used in connection with a binder material, means that the binder material can flow or migrate over practical manufacturing time periods, and includes thermoplastic materials in a viscoelastic state.

"Packing density" means, for a given area of a reflective fabric under test, the projected area of the beads (or portions thereof) located in the given area divided by the projected area of fabric in the given area, the projected areas being made in a common plane that is parallel to the area of the fabric under test. Unless otherwise specified, the packing density is measured at a given location on a fabric by inspection through a microscope of a substantially square or circular area having a size of approximately 1 mm².

"Reflectivity" of a retroreflective article is a measure of the apparent brightness of the article when viewed under standard retroreflective conditions (i.e., 0° orientation angle, –4° entrance angle, and 0.2° observation angle), which brightness is normalized for the area of the article and the illumination from the light source used. The reflectivity is also referred to as the coefficient of retroreflection ($R_A$), and is expressed in units of candelas per lux per square meter (cd/(lux·m²)) Reference is made to ASTM Standard Method E808-94, "Standard Practice For Describing Retroreflection". For a reflectorized fabric having a discontinuous binder material layer, so that only some portions of the front surface are covered with beads, the reflectivity as defined herein takes that fact into account so that the "area of the article" referred to above is limited to the portions of such area covered with beads.

"Reflective fabric", "Retroreflective fabric", and like terms mean fabric that retroreflects visible light to a level of reflectivity of at least about 1 cd/(lux·m²).

"Solid" or "solidify", when used in connection with a binder material, means that the binder material substantially ceases to flow or migrate over practical manufacturing timeframes, and does not require that the binder material be stiff or brittle.

All patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A method of making an exposed lens retroreflective fabric, comprising the steps of:

providing an extended length of fabric by unwinding an input roll of the fabric;

passing the fabric through a coating station that applies a coating of binder material to the fabric;

passing the fabric through a bead application station where aluminum-coated beads are applied to the coating of binder material; and passing the fabric through an etching station that removes exposed portions of the aluminum coating from the beads.

2. The method of claim 1, wherein the aluminum-coated beads fall onto the coating of binder material in a curtain at the bead application station.

3. The method of claim 1, wherein the bead application station forms a bank of beads, the beads being pressed against the coating of binder material on the fabric.

4. The method of claim 3, wherein the beads are pressed between the fabric and a roller.

5. The method of claim 1, wherein the aluminum-coated beads are applied to the coating of binder material with an average packing density greater than about 55%.

6. The method of claim 1, wherein the binder material is substantially solid but tacky when the beads first contact the binder material at the bead application station.

7. The method of claim 6, wherein the binder material comprises a thermoplastic and is made tacky at least in part by heating.

8. The method of claim 6, wherein the step of passing the fabric through the bead application station further comprises softening the binder material sufficiently to cause the beads to become partially embedded in the binder material.

9. The method of claim 1, wherein after passing the fabric through the bead application station but before passing the fabric through the etching station, the method further comprises:

substantially solidifying the binder material.

10. The method of claim 9, wherein the substantially solidifying step is selected from the group consisting of cooling, drying, heating, and curing.

11. The method of claim 1, wherein, after substantially passing the fabric through the bead application station but before passing the fabric through the etching station, the method further comprises:

winding up the fabric into an intermediate roll; and unwinding the fabric from the intermediate roll.

12. The method of claim 1, wherein the fabric is passed through the bead application station at a first rate and the fabric is passed through the etching station at a second rate different from the first rate.

13. The method of claim 1, wherein the coating station applies a continuous coating of binder material over substantially an entire surface of the fabric.

14. The method of claim 1, wherein the coating station applies a discontinuous coating of binder material onto the fabric.

15. The method of claim 14, wherein the discontinuous coating of binder material defines indicia thereon.

16. The method of claim 1, wherein the fabric has a fabric thickness, and the coating of binder material is applied in a layer that is thinner than the fabric thickness.

17. The method of claim 1, wherein the fabric has a front surface, and the steps of the method are carried out such that the coating of binder material remains concentrated near the front surface of the fabric.

18. The method of claim 1, wherein the fabric has a multitude of interstitial spaces provided therein.

19. The method of claim 1, wherein the etching station removes exposed portions of the aluminum coating from the beads by a step selected from the group consisting of dissolving the aluminum coating, ablating the aluminum coating, and converting the aluminum coating to a substantially transparent coating.

20. A roll-to-roll method of making an exposed lens retroreflective fabric, comprising:

unwinding an input roll of an extended length of fabric having a length of at least 10 meters, and a fabric thickness;

passing the fabric through a coating station that applies a coating of binder material to the fabric in a thickness greater than the fabric thickness;

passing the fabric through a bead application station where aluminum-coated beads are applied to the coating of binder material and the binder material is heated sufficiently to cause the beads to become partially embedded in the binder material;

cooling the fabric to cause the binder material to substantially solidify;

passing the fabric through an etching station that removes exposed portions of the aluminum coating from the beads; and winding up the fabric into at least one output roll.

* * * * *